United States Patent
Natanzon (10) Patent No.: US 9,910,735 B1
(45) Date of Patent: Mar. 6, 2018

(54) GENERATING AN APPLICATION-CONSISTENT SNAPSHOT

(71) Applicant: EMC Corporation, Hopkinton, MA (US)

(72) Inventor: Assaf Natanzon, Tel Aviv (IL)

(73) Assignee: EMC IP Holding Company LLC, Hopkinton, MA (US)

(*) Notice: Subject to any disclaimer, the term of this patent is extended or adjusted under 35 U.S.C. 154(b) by 17 days.

(21) Appl. No.: 15/084,672

(22) Filed: Mar. 30, 2016

(51) Int. Cl.
*G06F 11/14* (2006.01)
*G06F 3/06* (2006.01)

(52) U.S. Cl.
CPC .......... *G06F 11/1435* (2013.01); *G06F 3/065* (2013.01); *G06F 3/0619* (2013.01); *G06F 3/0665* (2013.01); *G06F 3/0689* (2013.01); *G06F 11/1451* (2013.01); *G06F 11/1464* (2013.01); *G06F 11/1492* (2013.01); *G06F 2201/84* (2013.01)

(58) Field of Classification Search
CPC .... G06F 11/1435; G06F 3/0619; G06F 3/065; G06F 3/0665; G06F 3/0689; G06F 11/1451; G06F 11/1464; G06F 11/1492; G06F 2201/84; G06F 11/1446; G06F 11/1469
USPC ........................................................ 711/114
See application file for complete search history.

(56) References Cited

U.S. PATENT DOCUMENTS

| | | | |
|---|---|---|---|
| 7,203,741 B2 | 4/2007 | Marco et al. | |
| 7,689,859 B2 * | 3/2010 | Westenberg | G06F 11/1466 714/6.11 |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |

(Continued)

OTHER PUBLICATIONS

Marc Staimer, Crash-consistent vs. application-consistent backups of virtual machines, Dec. 30, 2015, TechTarget.*

*Primary Examiner* — Hal Schnee
(74) *Attorney, Agent, or Firm* — Robert Kevin Perkins; Krishnendu Gupta (57) ABSTRACT

In one embodiment, a method includes generating a crash-consistent snapshot of a volume at a first point-in-time, mounting the snapshot to a host, running an application to access the snapshot, running an integrity tool to identify and repair a defect with the snapshot to form a modified snapshot and shutting down the application to form an application-consistent snapshot of the volume.

20 Claims, 4 Drawing Sheets

(56) References Cited

U.S. PATENT DOCUMENTS

| | | |
|---|---|---|
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B2 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,092,376 B1* | 7/2015 | Chelur ............. G06F 17/30088 |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,678,680 B1 | 6/2017 | Natanzon et al. |
| 9,684,576 B1 | 6/2017 | Natanzon et al. |
| 9,696,939 B1 | 7/2017 | Frank et al. |
| 9,778,990 B2* | 10/2017 | Forgette ............. G06F 11/1446 |
| 2005/0060607 A1* | 3/2005 | Kano ................. G06F 11/1435 714/15 |
| 2008/0178185 A1* | 7/2008 | Okada ................ G06F 11/1469 718/103 |
| 2010/0042791 A1* | 2/2010 | Helman ............. G06F 11/1435 711/162 |
| 2014/0149354 A1* | 5/2014 | Chan ...................... G06F 9/455 707/639 |

(56) References Cited

U.S. PATENT DOCUMENTS

2017/0024232 A1* 1/2017 Barve ................. G06F 9/45558
2017/0075774 A1* 3/2017 Beeken ............... G06F 11/1469
2017/0242599 A1* 8/2017 Patnaik ................ G06F 3/0619

* cited by examiner

GENERATING AN APPLICATION-CONSISTENT SNAPSHOT

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one embodiment, a method includes generating a crash-consistent snapshot of a volume at a first point-in-time, mounting the snapshot to a host, running an application to access the snapshot, running an integrity tool to identify and repair a defect with the snapshot to form a modified snapshot and shutting down the application to form an application-consistent snapshot of the volume.

In another embodiment, an apparatus includes electronic hardware circuitry configured to generate a crash-consistent snapshot of a volume at a first point-in-time, mount the snapshot to a host, run an application to access the snapshot, run an integrity tool to identify and repair a defect with the snapshot to form a modified snapshot and shut down the application to form an application-consistent snapshot of the volume. In an embodiment, the circuitry includes at least one of a processor, a memory, a programmable logic device or a logic gate.

In a further embodiment, an article includes a non-transitory computer-readable medium that stores computer-executable instructions. In an embodiment, the instructions cause a machine to generate a crash-consistent snapshot of a volume at a first point-in-time, mount the snapshot to a host, run an application to access the snapshot, run an integrity tool to identify and repair a defect with the snapshot to form a modified snapshot and shut down the application to form an application-consistent snapshot of the volume.

DETAILED DESCRIPTION

In some embodiments, techniques described herein may generate a snapshots of a volume that is application-consistent. For example in some embodiments, an application-consistent snapshot of the volume may be an application snapshot where the application was shut down in an orderly manner, or the application moved to an application-consistent mode while the snapshot was generated. While the description herein may describe taking a snapshot of a volume, in some embodiments, the techniques described herein may be applied to multiple volumes such as, for example, taking a snapshot of a logical unit that includes one or more volumes. In one particular example, some of the techniques described herein may generate an application-consistent snapshot of a virtual machine.

Figure 1A:
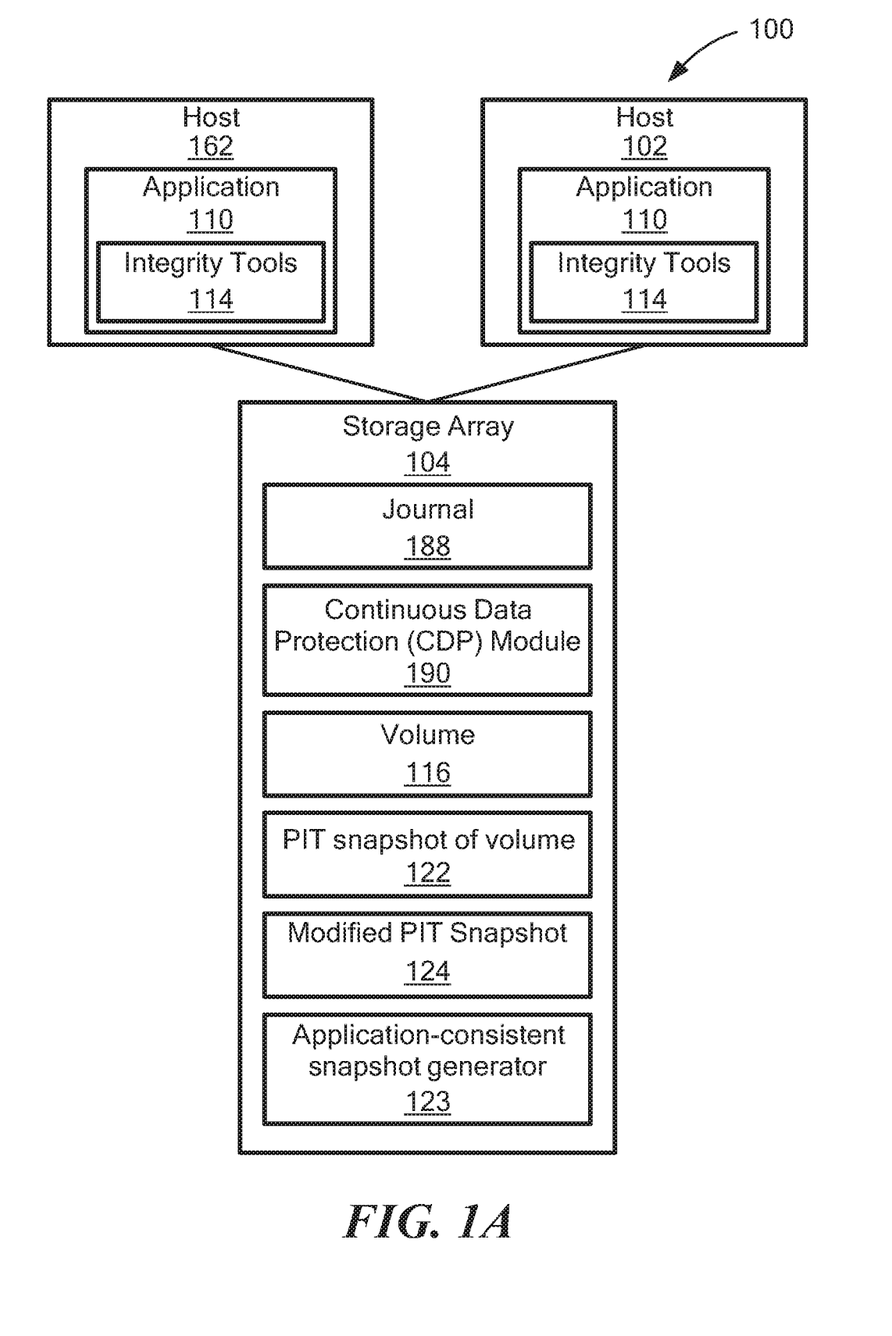
FIG. 1A is a simplified block diagram of an example of a portion of a data protection system configured to generate application-consistent snapshot of a volume, according to one embodiment of the disclosure.

Referring to FIG. 1A, a system 100 may be a portion of a data protection system configured to generate an application-consistent snapshot of a volume, according to one embodiment of the disclosure. The system 100 may include a host 102, a storage array 104 and a host 162.

In one example, the host 102 and the host 162 may include an application 110. The application 110 may include integrity tools 114. In one example, the integrity tools 114 may be used to determine if a snapshot of a volume is damaged (e.g., corrupted data) and may repair the damage in the snapshot.

The storage array 104 may include an application-consistent snapshot generator 123, a volume 116, a point-in-time snapshot 122 of the volume 116, a modified PIT snapshot 124, a journal 188 and a continuous data protection (CDP) module 190.

In one example, the application-consistent snapshot generator 123 using the CDP module 190 may be used to generate snapshots. For example, the point-in-time (PIT) snapshot 122) of the volume 116 is taken at a time, t1. In one example, the PIT snapshot 122 may be a crash-consistent snapshot. While a crash-consistent snapshot captures data at a point-in-time a crash-consistent snapshot may not be application-consistent (e.g., capable of being accessed and used by an application without errors). In one example, the application-consistent snapshot generator 123 enables a crash-consistent snapshot to be an application-consistent snapshot.

In one example, the journal 188 is a redo journal, which includes changes to the PIT snapshot 122 since time t1. In one example, the journal 188 and the CDP module 190 use similar techniques to provide continuous data protection as described in U.S. Pat. No. 9,274,718, issued Mar. 1, 2016, entitled "MIGRATION IN REPLICATION SYSTEM," which is assigned to the same assignee as the present patent application and is incorporated herein by reference in its entirety.

Figure 2:
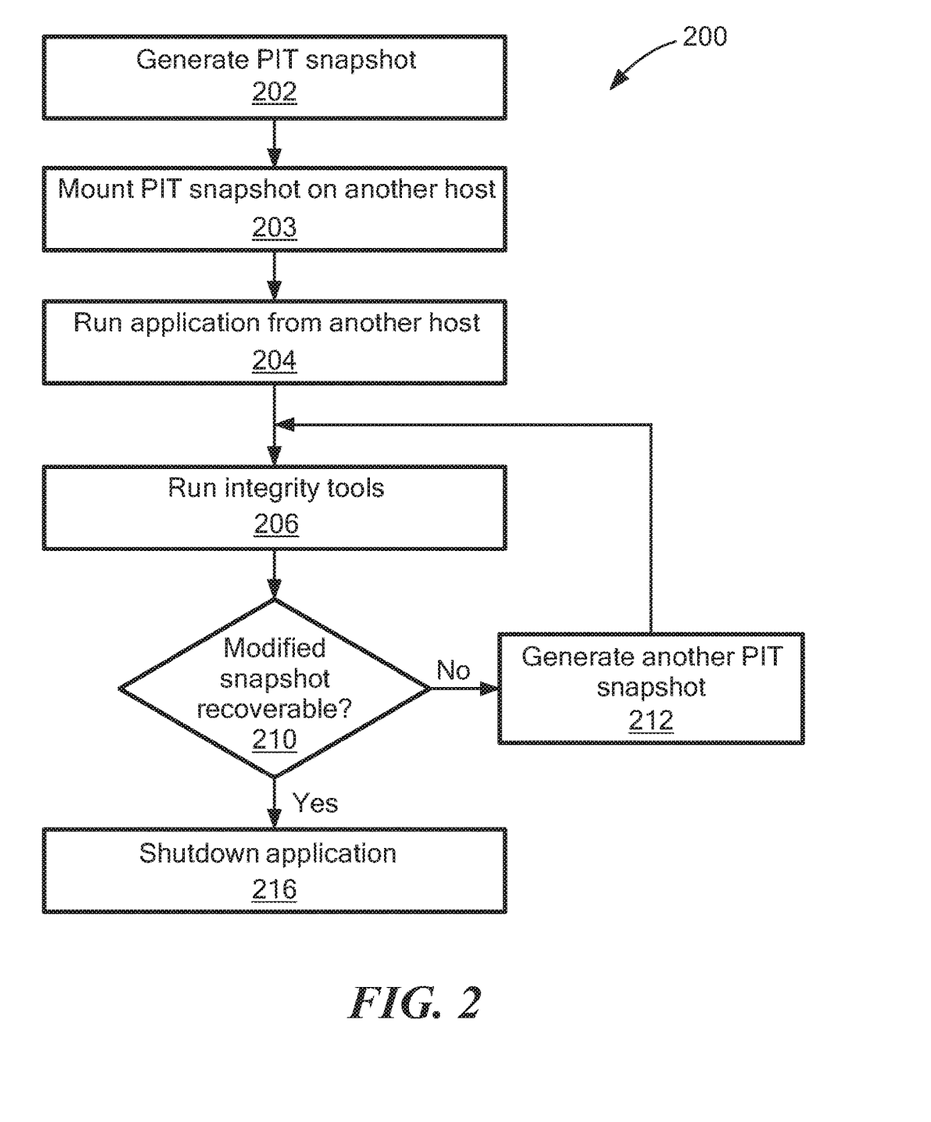
FIG. 2 is a flowchart of an example of a process to generate an application-consistent snapshot of a volume, according to one embodiment of the disclosure.

As described further herein, in the example embodiment of FIG. 1A, if the PIT snapshot 122 is not recoverable, the journal 188 and the CDP module 190 may be used to access another nearby point-in-time and a new snapshot may be generated and checked to determine if the new snapshot is recoverable (see for example, processing block 212 in FIG. 2).

In one example, if a recoverable snapshot is generated then the original snapshot (e.g., PIT snapshot 122) and journal (e.g., journal 188) may be erased. In the example embodiment of FIG. 1A, if a new PIT snapshot of a volume 116 is needed a new snapshot of the volume is generated and the changes to the volume since the new PIT snapshot was generated are tracked in the journal (e.g., journal 188).

In one particular example, application-consistent snapshot generator 123 may also execute integrity tools 114 to identify and repair damage to the PIT snapshot of volume 122 to form the modified PIT snapshot of volume 124. In one particular example, the application-consistent snapshot generator 123 may also run the application 110 to access the modified PIT snapshot of volume 124 to determine if the PIT snapshot is recoverable; and if so, may shut down the application 110. In some examples in order to run a fresh copy of the original application, a new host is attached to the snapshot of the application volume and the application is run. In one example, the application 110 may be shutdown in an orderly manner, which may include using application-dependent tools (e.g., application-specific application programming interface (API)). In some embodiments, the modified PIT snapshot of volume 124 becomes an application-consistent PIT snapshot.

Figure 1B:
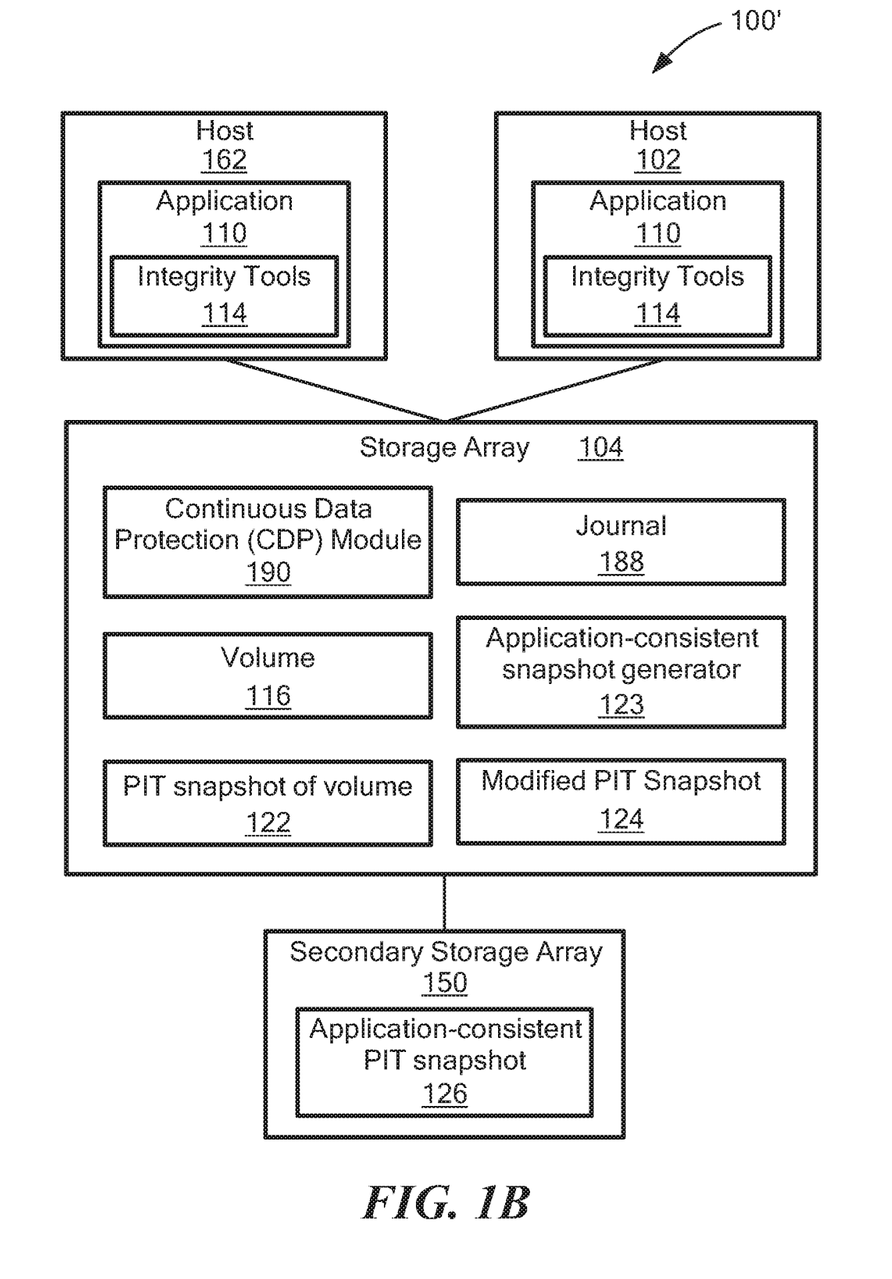
FIG. 1B is a simplified block diagram of another example of a portion of a data protection system configured to generate application-consistent snapshot of a volume, according to one embodiment of the disclosure.

Referring to FIG. 1B, a subsystem 100' may be a portion of a data protection system configured to generate an application-consistent snapshot of volume, according to one embodiment of the disclosure. The subsystem 100' may include a host 302, a storage array 104, a secondary storage array 150 and a host 162. In one example, subsystem 100' is similar the system 100 except the modified PIT snapshot of volume 124, after it is verified to be application-consistent (e.g., using process 200), is copied to the storage array 150 as application-consistent PIT snapshot 126.

Referring to FIG. 2, a process 200 is an example of a process to generate an application-consistent snapshot of a volume, according to one embodiment of the disclosure. Process 200 may select a PIT snapshot (202). For example, the application-consistent module 123 uses the journal 188 and the CDP module 190 to generate the PIT snapshot 122.

Process 200 may mount the PIT snapshot on another host (203). For example, the PIT snapshot 122 may be mounted by the host 162.

Process 200 may run an application on the other host (204) and may run integrity tools (206). For example, the host 162 may run the application 110 to access the PIT snapshot 122 and may initiate the integrity tools 114. In one example, the integrity tools 114 may attempt to identify and repair problems identified in a PIT snapshot of a volume (e.g., the PIT snapshot 122 (FIG. 1A)) to form a modified PIT snapshot of volume (e.g., the modified PIT snapshot 124 (FIG. 1A)). In one particular example, the repairs that are made are dependent on what application is used and may include file system repair, database validation and so forth. In one particular example, the integrity tools 114 may include an fsck (file system consistency check) system utility. In another example, the integrity tools 114 may include a scan disk (e.g., SCANDISK) utility. In a further example, the integrity tools 114 may include a check disk (e.g., CHKDSK) utility. In a still further example, the integrity may include recovery manager tools (e.g., RMAN).

In the example embodiment of FIG. 2, process 200 determines if the modified snapshot is recoverable (210). For example, the application-consistent generator 123 determines if the modified PIT snapshot 124 is recoverable.

In the example embodiment of FIG. 2, if the modified snapshot is not recoverable, process 200 retrieves another PIT snapshot (212). In one example, a modified snapshot may not be recoverable if one or more errors detected by the integrity tools 114 cannot be fixed. In some examples, the application-consistent generator 123 rolls back the journal 188 to generate another PIT snapshot of the volume. In one example, the new PIT snapshot of volume is a taken a next point-in-time after the point-in-time the PIT snapshot 122.

In the example embodiment of FIG. 2, if the modified snapshot is recoverable, process 200 may shutdown the application (216). In one example, the application 110 may be shut down normally by using, for example, an internal shut down command of the application or by unmounting the application. In one particular example, the application is shutdown using an application-specific application program interface (API). After processing block 216, the modified PIT snapshot 124 is an application-consistent snapshot.

Figure 3:
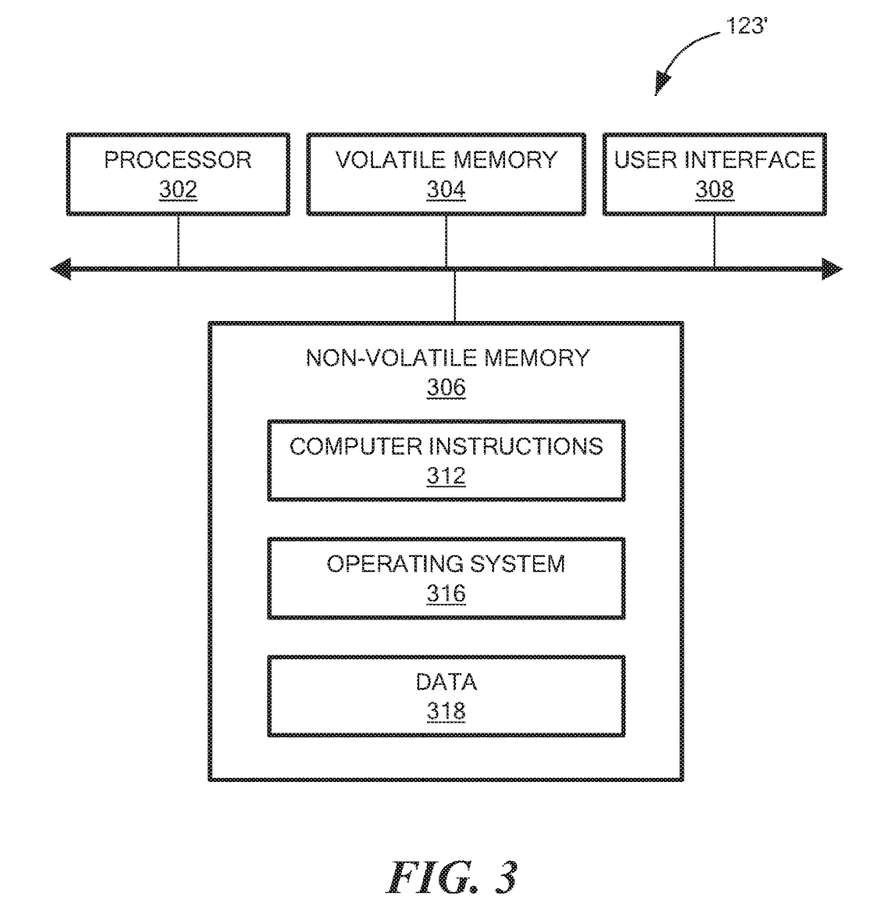
FIG. 3 is a computer on which any portion of the process of FIG. 2 may be implemented, according to one embodiment of the disclosure.

Referring to the example embodiment of FIG. 3, in one example, the application-consistent generator 123 may be the application-consistent generator 123'. The application-consistent generator 123' may include a processor 302, a volatile memory 304, a non-volatile memory 306 (e.g., hard disk, flash memory) and the user interface (UI) 308 (e.g., a graphical user interface, a mouse, a keyboard, a display, touch screen and so forth). The non-volatile memory 306 may store computer instructions 312, an operating system 316 and data 318. In one example, the computer instructions 312 may be executed by the processor 302 out of volatile memory 304 to perform at least a portion of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
   generating a crash-consistent snapshot of a volume at a first point-in-time, wherein the crash-consistent snapshot is not application consistent;
   mounting the crash-consistent snapshot to a host;
   running an application to access the crash-consistent snapshot;
   running an integrity tool to identify and repair a defect with the crash-consistent snapshot to form a modified snapshot; and
   shutting down the application to form an application-consistent snapshot of the volume based on the modified snapshot.

2. The method of claim 1, further comprising: determining if the modified snapshot is recoverable; and generating a second snapshot of the volume at a second point-in-time if the modified snapshot is not recoverable.

3. The method of claim 2, wherein determining if the modified snapshot is recoverable comprises determining that an error identified by the integrity tool is not repaired.

4. The method of claim 3, further comprising generating a new snapshot of the volume using a redo journal to access a new point-in-time if the modified snapshot is not recoverable.

5. The method of claim 3, further comprising generating a new snapshot of the volume using a continuous data protection (CDP) module to access a new point-in-time if the modified snapshot is not recoverable.

6. The method of claim 1, wherein shutting down the application comprises shutting down the program using an application-specific application program interface (API).

7. The method of claim 1, further comprising saving the application-consistent snapshot to a second storage array different from a first storage array storing the volume.

8. An apparatus, comprising:
   electronic hardware circuitry configured to:
   generate a crash-consistent snapshot of a volume at a first point-in-time, wherein the crash-consistent snapshot is not application consistent;
   mount the crash-consistent snapshot to a host;
   run an application to access the crash-consistent snapshot;
   run an integrity tool to identify and repair a defect with the crash-consistent snapshot to form a modified snapshot; and
   shut down the application to form an application-consistent snapshot of the volume based on the modified snapshot;
   wherein the circuitry comprises at least one of a processor, a memory, a programmable logic device or a logic gate.

9. The apparatus of claim 8, further comprising circuitry configured to:
   determine if the modified snapshot is recoverable; and
   generate a second snapshot of the volume at a second point-in-time if the modified snapshot is not recoverable.

10. The apparatus of claim 9, wherein the circuitry configured to determine if the modified snapshot is recoverable comprises circuitry configured to determine that an error identified by the integrity tool is not repaired.

11. The apparatus of claim 10, further comprising circuitry configured to generate a new snapshot of the volume using a redo journal to access a new point-in-time if the modified snapshot is not recoverable.

12. The apparatus of claim 10, further comprising circuitry configured to generate a new snapshot of the volume using a continuous data protection (CDP) module to access a new point-in-time if the modified snapshot is not recoverable.

13. The apparatus of claim 8, wherein the circuitry configured to shut down the application comprises circuitry configured to shut down the program using an application-specific application program interface (API).

14. The apparatus of claim 8, further comprising circuitry configured to save the application-consistent snapshot to a second storage array different from a first storage array storing the volume.

15. An article comprising:
   a non-transitory computer-readable medium that stores computer-executable instructions, the instructions causing a machine to:
   generate a crash-consistent snapshot of a volume at a first point-in-time, wherein the crash-consistent snapshot is not application consistent;
   mount the crash-consistent snapshot to a host;
   run an application to access the crash-consistent snapshot;
   run an integrity tool to identify and repair a defect with the crash-consistent snapshot to form a modified snapshot; and
   shut down the application to form an application-consistent snapshot of the volume based on the modified snapshot.

16. The article of claim 15, further comprising instructions causing the machine to:
   determine if the modified snapshot is recoverable; and
   generate a second snapshot of the volume at a second point-in-time if the modified snapshot is not recoverable;
   wherein the instructions causing the machine to determine if the modified snapshot is recoverable comprise instructions causing the machine to determine that an error identified by the integrity tool is not repaired.

17. The article of claim 16, further comprising instructions causing the machine to generate a new snapshot of the volume using a redo journal to access a new point-in-time if the modified snapshot is not recoverable.

18. The article of claim 16, further comprising instructions causing the machine to generate a new snapshot of the volume using a continuous data protection (CDP) module to access a new point-in-time if the modified snapshot is not recoverable.

19. The article of claim 15, wherein the instructions causing the machine to shut down the application comprise instructions causing the machine to shut down the program using an application-specific application program interface (API).

20. The article of claim 15, further comprising instructions causing the machine to save the application-consistent snapshot to a second storage array different from a first storage array storing the volume.

* * * * *